Nov. 9, 1954 — R. G. TURNER — 2,693,831
SHUTTLE CHECK FOR LOOMS
Filed May 27, 1953 — 2 Sheets-Sheet 1
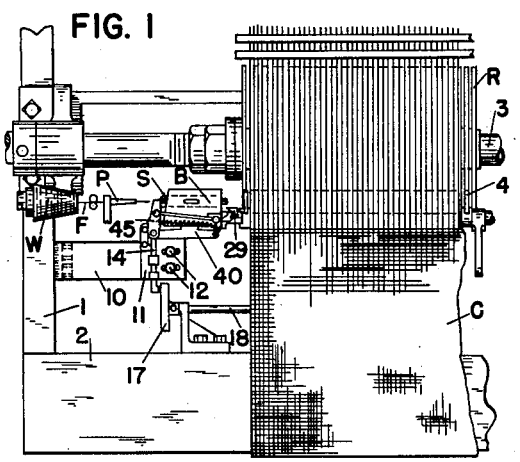
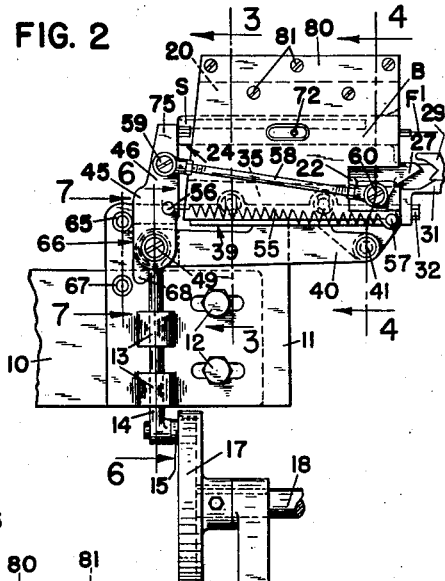
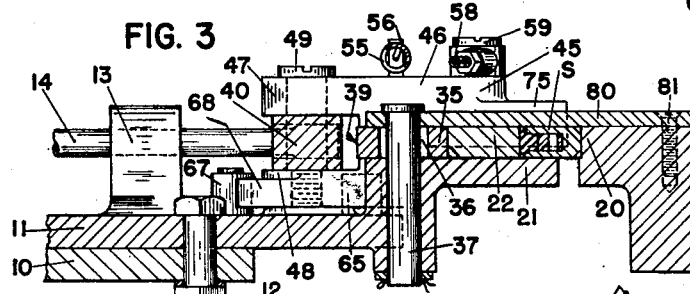
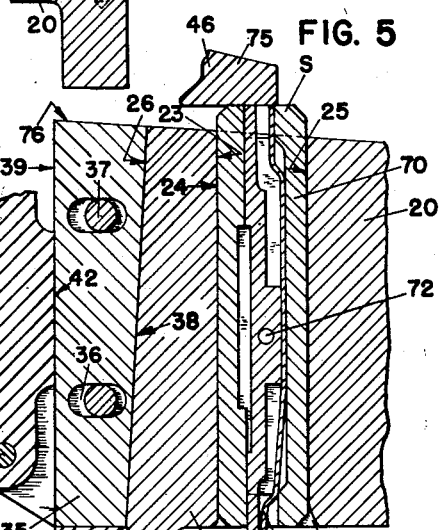
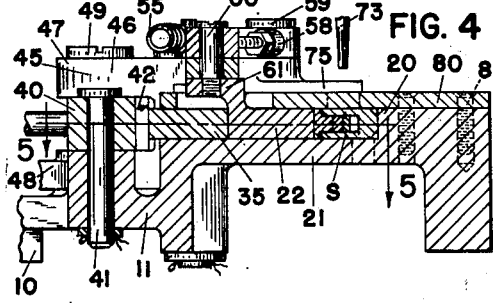
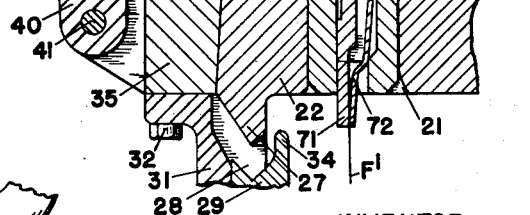
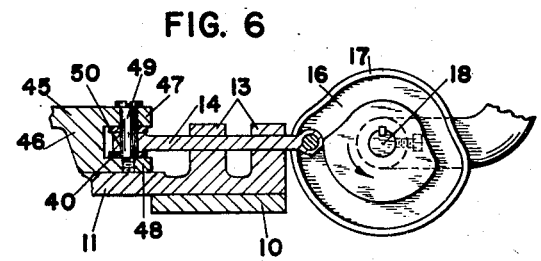
INVENTOR
RICHARD G. TURNER
Chas. T. Hawley
ATTORNEY

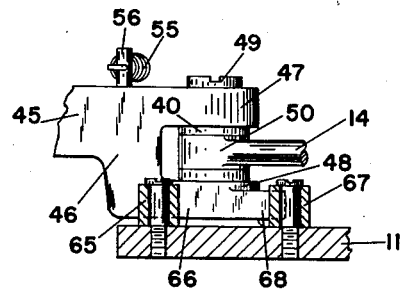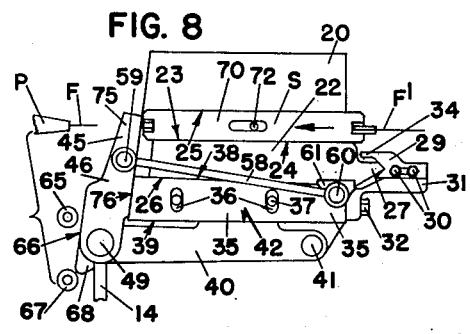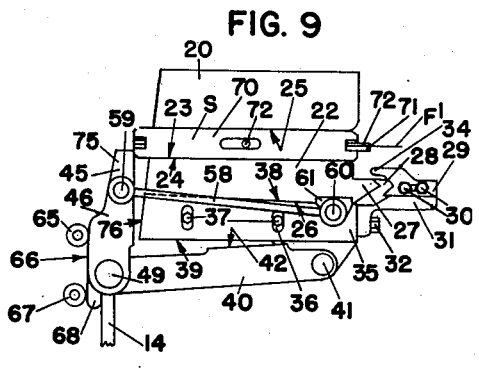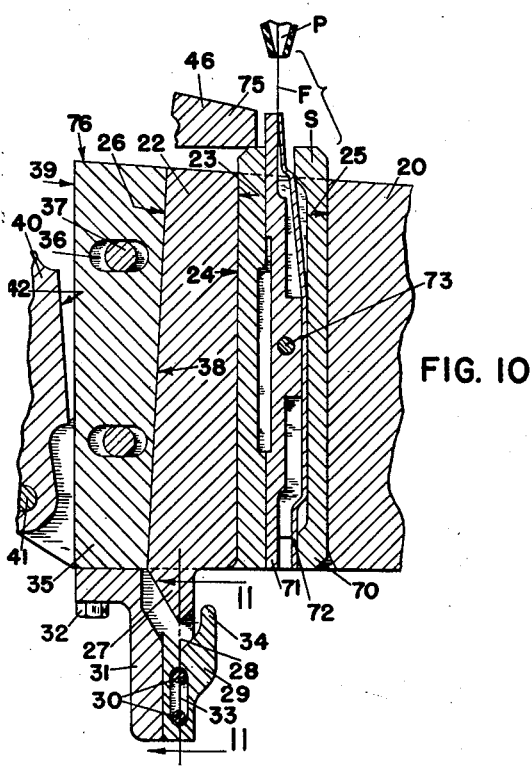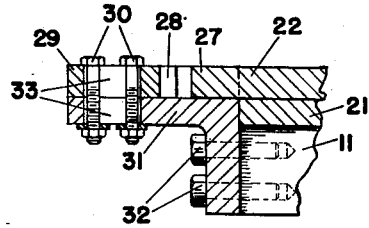
INVENTOR
RICHARD G. TURNER
ATTORNEY

United States Patent Office 2,693,831
Patented Nov. 9, 1954

2,693,831

SHUTTLE CHECK FOR LOOMS

Richard G. Turner, Worcester, Mass., assignor to Crompton & Knowles Loom Works, Worcester, Mass., a corporation of Massachusetts Application May 27, 1953, Serial No. 357,849

21 Claims. (Cl. 139—186)

This invention relates to improvements in shuttle checks for looms operating more particularly with thread gripper shuttles, and it is the general object of the invention to provide a shuttle check so constructed as to cause the shuttle to apply a checking force to itself incident to its movement into the shuttle box.

In looms operating with gripper type shuttles it is desirable to bring the shuttle to rest at the end of its flight very promptly and in accurate position for a threading operation. In order to achieve this result it is an important object of the invention to provide an operating means at the outer end of the shuttle box to be engaged by the shuttle and when thus engaged move a wedge shaped checking member lengthwise of the shuttle and also transversely of the shuttle box against the shuttle to apply a stopping force to the latter.

After the shuttle has been brought to rest it is desirable to be able to move it lengthwise of the shuttle box to a given position to facilitate threading and it is the further object of the invention to provide means which will release the checking force as soon as the shuttle has been brought to rest so that if necessary the shuttle can be moved to correct position. Release of the checking force may be effected by means of a cam and a holding member moved by the cam in a direction to lessen a force previously exerted by the holding member on the checking member and shuttle.

The form of shuttle for which the shuttle box is more particularly designed employs a pair of thread grippers which slide lengthwise of the shuttle and when projected from one end of the shuttle grip a thread and at substantially the same time release a previously gripped thread at the opposite end. When the shuttle is brought to rest abruptly the gripper members tend by their momentum to continue in motion and if they were permitted thus to move they would effect an untimely release of the thread.

It is a further object of the invention to provide a stop for the gripper members which will be in position to prevent their lengthwise movement relative to the shuttle which might otherwise attend stopping of the shuttle. The stop is then moved out of the path of the grippers so that they can intentionally be moved relative to the shuttle at the desired time in the cycle of the loom to grip a thread. The stop may conveniently be a part of the aforesaid operating means which is moved by the shuttle.

When the gripper members are moved to release a previously gripped thread they may tend to move the shuttle beyond its proper position for a threading operation, and it is a further object of the invention to provide a stop which will prevent improper movement or positioning of the shuttle by the gripper members. This may be effected by moving the stop for the grippers only far enough to clear the grippers and then arresting its motion while it is still in position to restrain the shuttle.

When the shuttle is picked out of the shuttle box the operating member will return to its normal checking position in the path of the shuttle preferably under the action of a spring and in doing so may move the wedge shaped checking member inwardly toward the center of the shuttle box. It is a further object of the invention to provide a positioner for the wedge shaped member to engage a part of it and cause it to assume its normal checking position against a guide provided for it when the operating means has completed its return movement to normal position.

In order that the invention may be clearly understood reference is made to the accompanying drawings which illustrate by way of example the embodiments of the invention and in which:

Fig. 1 is a plan view of part of a loom having the invention applied thereto,

Fig. 2 is an enlarged view of part of Fig. 1 showing a shuttle fully boxed and with the operating means in position to prevent lengthwise movement of the gripper members, Figs. 3 and 4 are enlarged vertical sections on lines 3—3 and 4—4, Fig. 2, Fig. 5 is a horizontal section on line 5—5, Fig. 4, Fig. 6 is a front elevation partly in section looking in the direction of arrow 6, Fig. 2, Fig. 7 is an enlarged detailed vertical section on line 7—7, Fig. 2, Fig. 8 is a diagrammatic plan view showing the parts in the position they assume at the beginning of a shuttle checking operation, Fig. 9 is a view similar to Fig. 8, but showing the parts in the position they assume at a later time in the operation of the loom, Fig. 10 is a view similar to Fig. 5, but shows the stop for the gripper members moved out of registry with them so that they can be given a thread gripping movement, and Fig. 11 is a vertical section on line 11—11, Fig. 10.

Referring to Figs. 1 and 2 the loom frame 1 includes a breast beam 2 over which the cloth C passes. A rotary reed R is mounted on a shaft 3 which turns preferably uniformly during loom operation. Guides 4 are provided for directing the path of the shuttle S through the warp shed and with respect to the shuttle box to be described. The loom operates with a stationary weft supply W and has a thread presenter P through which the weft thread F from supply W passes to be picked up by the shuttle. The matter thus far described is for illustrative purposes only and the invention is not necessarily limited in its use to the rotary reed, which, together with the guides 4, may be as shown in my co-pending application Serial No. 247,129, filed September 18, 1951.

Mounted on the loom frame 1 is a support 10 to which a stand 11 is secured by bolts 12. The stand has slide bearings 13 in which reciprocates a rod 14 the forward end of which is provided with a roll 15 fitting into groove 16 of a cam 17 secured to a shaft 18 which rotates during loom operation. The purpose of the rod and cam will be set forth hereinafter.

The rear part of the stand is formed with a stationary shuttle engaging wall 20 which forms the back part of the shuttle box designated generally at B. The stand 11 is formed with a horizontal floor plate 21 part of which provides the bottom of the shuttle box B.

A wedge shaped shuttle checking wall member 22 forming the front of the shuttle box B is slidable on the floor plate 21 lengthwise of the shuttle box and has a rear surface 23 to engage the front side 24 of the shuttle. The surface 23 is preferably parallel to a shuttle engaging surface 25 on the fixed back wall 20 which engages the rear side of the shuttle. The front of the checking member 22 is provided with a surface 26 inclined toward the shuttle box in the direction in which the shuttle travels when entering the shuttle box, that is, it is inclined in a direction toward the outer end of the shuttle box. The member 22 has a tongue 27 normally fitting into a notch or pocket 28 formed in a positioning means 29 which is held by screws 30 to a small support 31 fixed with respect to the stand 11 by screws 32. Slots 33 in support 31 and the positioning means enables the latter to be adjusted lengthwise of the shuttle box. A finger 34 on the positioner 29 extends behind the tongue 27 as shown in Fig. 5 to limit movement of the tongue toward wall 20.

A guide member or means 35 also rests on the floor plate 21 and has transverse slots 36 extending backwardly and forwardly with respect to the shuttle box through which extend guide pins 37 fixed with respect to the stand 11 and acting to prevent movement of the member 35 lengthwise of the shuttle box. The guide member 35 has a surface 38 inclined similarly to surface 26 and normally in position for relative sliding engagement with respect to the shuttle checking member 22. The front part of the guide 35 has a surface 39 which is preferably though not necessarily parallel to the surfaces 23 and 25.

A holding member or lever 40 is pivoted on a stud 41 fixed with respect to the stand 11. The holding member has a surface 42 for engagement with the surface 39. The holding member can be swung around its pivot to move the guide member 35 rearwardly, or toward the axis of the shuttle box.

An operating means designated generally at 45 comprises a lever 46 the forward end of which is forked to have upper and lower parts 47 and 48, respectively, through which a pivot stud 49 passes. The stud also passes through the forked left end of the holding member as viewed in Fig. 2 and the previously described rod 14 has a rod head 50 within the forked end of holding lever 40 and through which the stud 49 passes. The relation of the lever 46, the holding member 40, and the stud 14 is shown in Figs. 6 and 7.

A tension coiled return spring 55 has the left end thereof connected at 56 to lever 46 and has the right end thereof held by a stationary upright pin 57 on the stand 11. The effect of spring 55 is to tend to turn the lever 46 in a clockwise direction around stud 49 as viewed in Fig. 2. Operative connections between the operating means and checking member includes a link or rod 58 one end of which is pivoted at 59 to the lever 45 and the other end of which is pivoted to a stud 60 secured to a forward extension 61 of the shuttle checking member 22, see Fig. 4. The effect of the rod 58 is to cause the lever 46 to move the member 22 lengthwise of the shuttle box when the lever turns on stud 49.

A roll stop 65 on the stand 11 is positioned for engagement with a surface 66 on the left hand side of the lever 46 as viewed in Fig. 2, and a second roll stop 67 also on the stand 11 is provided for engagement with a forwardly extending finger 68 on lever 46. The purpose of these stops will be set forth presently.

The shuttle S with which the shuttle check operates comprises a body 70 within which are located rigid and flexible thread gripper members 71 and 72, respectively. The rigid member is provided with a hole 72 to receive a shuttle placing means 73, Fig. 4, which is operated by the loom independently of the shuttle check. When the shuttle is approaching from the right as viewed in Fig. 2 the gripper members 71 and 72 will be projected from the rear or trailing end thereof and grip a thread F1. Since the members 71 and 72 are slidable within the shuttle they will tend due to their momentum to continue moving when the shuttle is arrested and if this relative motion between the gripper members and the shuttle should occur during checking of the shuttle the thread F1 might be released too early in the cycle of loom operations. In order to prevent untimely sliding movement of the gripper members relative to the shuttle the rear end 75 of the operating lever 46 is positioned for engagement with the spaced advancing ends of the gripper members when the shuttle enters the box, see Fig. 5. The shuttle is not claimed herein but is set forth in more detail and claimed in my copending application Serial No. 357,735 filed May 27, 1953, to which reference may be had for a further description of the shuttle.

Under normal conditions the parts will be in the position shown in Fig. 8 as the shuttle enters the box, the lever 46 being held by spring 55 against an adjacent wall 76 of the guide member 35 and the tongue 27 fitting into the notch 28. At this time the surface 66 of lever 46 will be spaced from the rear roll stop 65 and the finger 68 will be slightly behind the roll stop 67, and end 75 of lever 46 will be in the path of the grippers and the shuttle. Also, the cam 17 will be in such position as to cause rod 14 to locate holding member 40 in rear position to hold the surface 42 against the surface 39, thereby reinforcing guide member 35. The gripper members 71 and 72 will be in the position relative to the shuttle shown in Fig. 5, but the shuttle will not yet have reached the outer end of the shuttle box.

As the shuttle approaches the end of its travel in the shuttle box it will strike the end 75 of the lever 46 and rock the lever 46 from the position shown in Fig. 8 to that shown in Fig. 2. Rocking of the lever 46 will cause the connector rod 58 acting through stud 60 to move the shuttle checking member 22 lengthwise with respect to the shuttle box in the direction of travel of the shuttle and cause relative sliding of surfaces 26 and 38 which will cooperate to produce a transverse motion of the member 22 with respect to the shuttle box in a rearward direction toward the stationary wall 20, thereby exerting lateral force on the shuttle to bring the latter promptly to rest.

During arresting of the shuttle the end 75 of lever 46 will be in rear position and across the path of lengthwise movement of the grippers 71 and 72 and will therefore prevent them from moving due to their momentum relative to the shuttle in the direction of motion of the shuttle. At this time the holding member 40 will prevent guide member 35 from moving forwardly, or laterally with respect to the checking member 22.

As soon as the shuttle has come to rest the cam and rod 14, acting as control means, will move the lever 46 forwardly to the position shown in 9 in which the lever end 75 will be out of the path of the grippers but will still be in position to serve as a stop preventing further movement of the shuttle to the left, Fig. 9. The roll stop 65 at this time engages surface 66 and positively prevents angular movement of lever 46 in a left hand direction as viewed in Fig. 9. During the forward motion of lever 46 the finger 68 will move to the position shown in Fig. 9 with respect to the front roll stop 67 and the lever 46 will therefore be held against rocking in either direction around stud 49.

As the rod 14 is moved forwardly it moves the surface 42 away from the surface 39, thereby permitting forward motion of the guide member 35 due to slots 36 to reduce the force acting laterally on the checking member 22. The shuttle can thus be moved lengthwise with respect to the shuttle box in an outward direction, if necessary, by the placer 73 when the latter comes into action to move the thread grippers from the position shown in Fig. 5 to that shown in Fig. 10 to perform a thread gripping operation. Because of the action of roll stop 67 and finger 68 the spring 55 will not be able to give lever 46 a return motion to its normal position shown in Fig. 8 until after the cam has again moved the rod 14 rearwardly to disengage the finger 68 from the roll stop 67.

The cam will hold the lever 46 and the holding member 40 in the forward position shown in Fig. 9 until after the shuttle has been picked by any approved means (not shown). Thereafter the cam will effect rearward movement of the stud 49 as already suggested, whereupon the spring 55 will cause clockwise turning of lever 46 around stud 49 and give the operating means 45 and shuttle checking member 22 a return motion to normal position. During rearward movement of the holding member 40 the finger 34 will keep tongue 27 aligned with notch 28, and near the end of the return motion of the checking member 22 the tongue 27 will be guided by finger 34 into notch 28.

It will be noted from Fig. 8 that the rod 58 is connected to the member 22 by means of the stud 60 which is farther from the axis of the shuttle box B than is the tongue 27 and as a result of this relationship the spring 55 acting through lever 46 and rod 58 will tend to turn the member 22 around the notch 28 in a counter-clockwise direction as viewed in Fig. 8 if the member 22 should by any circumstance be slightly misplaced and out of engagement with the inclined surface 38. Return of the parts to their normal position will therefore insure engagement of the shuttle check member 22 with the guide member 35.

In order that the members 22 and 35 may be held in position on the floor plate 21 there is provided a cover 80 which is secured by screws 81 to the rear fixed wall 20 of the shuttle box. This cover may serve as a top for the shuttle box and also holds the member 22 and the guide 35 in correct horizontal alignment.

From the foregoing it will be seen that the invention sets forth a shuttle check wherein the shuttle when approaching the end of its travel engages the operating means such as lever 45 to move the wedge shaped shuttle checking member 22 lengthwise and outwardly with respect to the shuttle box so that the inclined surfaces will force the member 22 against the side of the shuttle to bring the latter to rest. The lever 45 acts as stop means to prevent the thread gripper means 71 and 72 from moving lengthwise relatively to the shuttle due to their momentum, but thereafter control means including the cam and the rod 14 move the lever 45 transversely of the shuttle box out of register with the grippers, whereupon placing means 73 can then move the grippers to effect release of a previously gripped thread and pick-up of a fresh thread. The guide member 35 is reinforced by the holding lever 40 during boxing of the shuttle, after which the control means moves the holding lever forwardly to reduce pressure on the shuttle so that the latter can be moved if necessary incident to the thread pick-up operation and can later be picked out of the box without being required to overcome the checking force. The levers 40 and 45 are pivoted to each other and are moved conjointly by the single control means. The parts 27 and 28 constitute positioning means which cooperate with spring 55 and link 58 to cause the member 22 to engage the guide member 35 when the operating lever and sliding checking member 22 are returned to their normal position. This result is accomplished by having a force applied by the link 58 at a point farther from the axis of the box than is the pocket 28. Also, the roll stops act first to limit movement of lever 45 by the shuttle, and then to prevent premature return movement of the lever 45 to normal position by spring 55.

Having now particularly described and ascertained the nature of the invention and in what manner the same is to be performed, what is claimed is:

1. In a shuttle box for a loom shuttle, a fixed shuttle engaging wall on one side of the shuttle box, a shuttle checking wall member on the opposite side of the shuttle box mounted for movement lengthwise of the shuttle box and having a shuttle engaging surface on the side thereof facing the fixed wall and having a surface on the opposite side thereof inclined toward the shuttle box in the direction of entrance of a shuttle into the shuttle box, a lever extending across said shuttle box engaged and rocked by the shuttle as the latter approaches the end of its travel into the box, a link connecting the lever and checking wall member moving the latter lengthwise of the shuttle path in the direction of travel of the shuttle into the box when the lever is rocked by the shuttle, and guide means normally held against movement lengthwise and laterally relative to said box having an inclined surface coacting with said inclined surface on said checking wall member to move the latter toward said fixed wall to check the shuttle when the latter rocks said lever.

2. In a shuttle box for a loom shuttle, a fixed shuttle engaging wall extending along one side of the shuttle box, a shuttle checking wall member extending along the opposite side of the shuttle box mounted for movement lengthwise of the box and having a shuttle engaging surface on the side thereof facing the fixed wall, a guide member normally held against motion lengthwise of the shuttle box, means on said members including a surface inclined relatively to said shuttle box effective when said checking wall member has a movement lengthwise of the shuttle box in the direction of travel of the shuttle when the latter enters the shuttle box to give said checking wall member a lateral movement toward said fixed wall to check the shuttle, operating means mounted independently of the checking member for movement on the shuttle box and extending into the path of the shuttle to be moved by the shuttle incident to entry thereof into the shuttle box, and operative connections between said checking wall member and said operating means to effect said lengthwise and lateral movements of the checking wall member when the shuttle moves said operating means.

3. The shuttle check set forth in claim 2 wherein said guide member is mounted for transverse movement relative to said shuttle box and holding means mounted for movement on the shuttle box normally prevents said transverse movement of the guide member, and control means acts to move said holding means transversely of the shuttle box in a direction away from the shuttle box to reduce the force exerted by the checking member on the shuttle.

4. The shuttle check set forth in claim 3 wherein said holding means is a lever mounted for pivotal movement transversely of said shuttle box and the control means swings said lever in a direction away from the shuttle box to reduce the force exerted on the shuttle prior to picking of the shuttle out of the shuttle box.

5. The shuttle check set forth in claim 3 wherein said holding means is mounted for movement transversely of said shuttle box and said operating means includes a lever pivoted on said holding means, and control means acts to move said holding means in a direction away from said shuttle box to reduce the force exerted on the shuttle by said checking member.

6. In a loom having a shuttle box, a shuttle to enter the box, thread gripper means movably mounted on the shuttle and tending due to momentum thereof when the shuttle is stopped to have a movement relative to the shuttle which would release a gripped thread attached to the shuttle, checking means to arrest motion of the shuttle as the latter enters the shuttle box, and operating means for the checking means normally in position to be engaged by the shuttle and the gripper and moved by the shuttle incident to entry thereof into the shuttle box and effective when thus moved by the shuttle to cause said checking means to arrest the shuttle, said operating means also preventing said gripper means from having said movement relative to the shuttle.

7. In a loom having a shuttle box, a shuttle to travel along a path and enter the shuttle box, thread gripper means mounted on the shuttle for sliding movement lengthwise thereof and tending due to the momentum thereof when the shuttle is stopped to have said sliding movement relative to the shuttle in the direction of motion of the shuttle to release a gripped thread attached thereto, shuttle checking means to arrest the shuttle, and operating means mounted for movement on the shuttle box operatively connected to the checking means and having a part thereof in register with the shuttle and the gripper means when the shuttle enters the shuttle box, the shuttle when moving in the box engaging and moving the operating means and the latter thereupon causing the checking means to stop the shuttle and said part of the operating means preventing said sliding movement of the gripper means relative to the shuttle.

8. The structure set forth in claim 7 wherein said operating means comprises a lever mounted for angular movement with respect to the shuttle box and a link operatively connecting the lever to said checking means.

9. The structure set forth in claim 7 wherein control means are provided to move said part of the operating means laterally with respect to the shuttle out of register with said gripper means subsequent to stopping of the shuttle by said checking means.

10. The structure set forth in claim 7 wherein said checking means includes a checking member movable lengthwise of the shuttle box operatively connected to said operating means, a guide member movable transversely of the shuttle box and inclined plane contacting means on said checking and guide members, holding means normally preventing transverse movement of the guide member by the checking member, and control means acting subsequent to stoppage of the shuttle in the shuttle box to move said holding means away from the shuttle box to reduce the force exerted on the shuttle and also move said operating means transversely of the shuttle box out of register with said gripper means.

11. The structure set forth in claim 7 wherein control means moves said part of the operating means out of register with said gripper means but allows said part to remain in register with the shuttle, and placing means thereupon moves said gripper means lengthwise of the shuttle in the direction of travel of the latter to release said gripped thread.

12. The structure set forth in claim 7 wherein control means moves said part of the operating means out of register with the gripper means but maintains said part in register with the shuttle, and wherein placing means moves the gripper means lengthwise of the shuttle in the direction of travel of the latter when entering the box to release said gripped thread while said operating means prevents the shuttle from being moved by said placing means.

13. The structure set forth in claim 12 wherein said part of the operating means is a lever operatively connected to said checking means and the free end of the lever is in register with said shuttle and gripper means, and a stop is provided for the lever, the latter being normally spaced from said stop but moved against the stop by said mechanism, whereupon the stop prevents movement of said lever and shuttle by the placing means when the latter moves the gripper means.

14. The structure set forth in claim 12 wherein said part of the operating means is a lever and a stop for the lever is provided normally out of engaging position relative to the lever when the latter is in register with both the shuttle and gripper means, and control means moves the lever out of register with the gripper means and when doing so moves the lever into engagement with said stop whereupon the latter prevents movement of the lever in a direction to move the shuttle out of the shuttle box.

15. In a shuttle box for a loom shuttle, a fixed shuttle engaging wall extending along one side of the shuttle box, a shuttle checking wall member extending along the opposite side of the shuttle box mounted for movement from the normal position thereof lengthwise of the box in the direction of motion of a shuttle entering the shuttle box and having a shuttle engaging surface on the side thereof facing the fixed wall, a guide member held against motion lengthwise of the shuttle box, means on said members including a surface inclined relatively to said shuttle box effective when said checking wall member has said movement away from the normal position thereof lengthwise of the shuttle box to give said checking wall member a lateral movement toward said fixed wall to check the shuttle, operating means mounted independently of the shuttle checking member for movement relative to the shuttle box, the shuttle incident to entry thereof into the shuttle box engaging the operaing means and giving the same a checking movement, said operating means being capable of a return movement in a direction opposite to the checking movement, operative connections between said operating means and said shuttle checking member effective to give the latter said lengthwise movement when the operating means is given said checking movement thereof by said shuttle, and return means effective subsequent to picking the shuttle out of the shuttle box to give said operating means a return movement and thereby cause said operative connections to give said checking member a return movement to the normal position thereof.

16. The shuttle box construction set forth in claim 15 wherein positioning means cooperates with said operative connections and said return means as the checking member approaches the end of its return movement to the normal position thereof to hold the checking member against the guide member.

17. The shuttle box construction set forth in claim 16 wherein the operative connections comprise a link pivoted to the checking member at a point more distant from the axis of the shuttle box than is the positioning means.

18. The shuttle box construction set forth in claim 16 wherein the positioning means has a pocket located a given distance from the axis of the shuttle box to receive a tongue on the checking member and the operative connections are attached to the checking member at a distance from said shuttle box axis greater than said given distance.

19. The shuttle box construction set forth in claim 18 wherein the positioning means has a finger thereon extending between the axis of the shuttle box and said tongue to limit movement of the checking member toward said axis.

20. The shuttle box construction set forth in claim 18 wherein the positioning means has a pocket to receive said tongue and a finger between the axis of the shuttle box and said tongue directs the latter into said pocket incident to return movement of the checking member to the normal position thereof.

21. In a loom having a shuttle box, a shuttle to enter the box, thread gripper means movably mounted on the shuttle and tending due to the momentum thereof to have a movement relative to the shuttle when the latter is stopped which would release a gripped thread attached to the shuttle, checking means extending into the path of said gripper to prevent said movement of the gripper when the shuttle is stopped, and control means for the checking means acting subsequent to stopping of the shuttle effective to move said checking means out of the path of said gripper to enable the latter to have said movement relative to the shuttle to release the gripped thread.

No references cited.